United States Patent [19]

Ogawa

[11] Patent Number: 5,545,255
[45] Date of Patent: Aug. 13, 1996

[54] FINISHING AGENT AND METHOD OF USING THE SAME

[75] Inventor: Kazufumi Ogawa, Osaka, Japan

[73] Assignee: Matsushita Electric Industrial Co., Ltd., Osaka, Japan

[21] Appl. No.: 427,720

[22] Filed: Apr. 21, 1995

Related U.S. Application Data

[63] Continuation of Ser. No. 68,661, May 27, 1993, abandoned.

[30] Foreign Application Priority Data

| May 27, 1992 | [JP] | Japan | 4-135382 |
| Sep. 14, 1992 | [JP] | Japan | 4-244534 |

[51] Int. Cl.$^6$ ........................................ C09G 1/02
[52] U.S. Cl. .................. 106/272; 106/287.14; 556/471; 556/484; 556/485; 556/488
[58] Field of Search ................... 556/400, 471, 556/484, 485, 488; 106/272, 287.13, 287.14

[56] References Cited

U.S. PATENT DOCUMENTS

| 4,028,391 | 6/1977 | Foley | 260/448.2 |
| 4,627,950 | 12/1986 | Matsui et al. | 264/103 |
| 4,824,766 | 4/1989 | Ogawa | 430/299 |
| 5,017,222 | 5/1991 | Cifuentes et al. | 106/272 |
| 5,234,718 | 8/1993 | Mino et al. | 427/352 |

FOREIGN PATENT DOCUMENTS

| 59-157169 | 9/1984 | Japan . |
| 63-197586 | 8/1988 | Japan . |
| 3100060 | 4/1991 | Japan . |

OTHER PUBLICATIONS

Translation of JP 63–197586.
Translation of JP 3–100060.
Translation of JP 59–157169.

*Primary Examiner*—Michael Lusignan
*Assistant Examiner*—Erma Cameron
*Attorney, Agent, or Firm*—Fish & Richardson PC

[57] ABSTRACT

An ultra thin, water and oil repelling and durable overcoat is easily formed on a substrate surface via covalent bonding by applying a finishing agent of the invention, comprising a chemically adsorptive compound with a chlorosilyl group and a nonaqueous viscous liquid or solid medium, on the substrate surface. A finishing agent, comprising a chemically adsorptive compound with a chlorosilyl group and a nonaqueous viscous liquid or solid medium, is applied on a substrate surface comprising hydrophilic groups. The substrate surface is then reacted with the chemically adsorptive compound at room temperature, and the agent containing unreacted chemically adsorptive compound is removed. The generation of hydrochloric acid gas can be prevented by adding tertiary amine or amide in the molar amount of one to three times more than the chemically adsorptive compound contained in the finishing agent.

14 Claims, 1 Drawing Sheet

FINISHING AGENT AND METHOD OF USING THE SAME

This application is a continuation of U.S. application Ser. No. 08/068,661, filed May 27, 1993, now abandoned.

FIELD OF THE INVENTION

The invention relates to a finishing agent and a method of using the same. More particularly, the invention relates to the method of forming a durable ultra thin water and oil repelling chemically adsorbed overcoat on the surface of a substrate.

BACKGROUND OF THE INVENTION

Finishing agents have been used in many fields; automobile wax, floor and interior products, glazing agents, fur polish, lubricants for a papered sliding door or sliding paper door, and mechanical parts or the like.

The above-noted conventional finishing agents are solid or emulsified, and generally comprise the mixture of a petroleum solvent, silicone, wax or lower alcohol, and an abrasive material.

Conventional finishing agents have weak water repelling and lustering properties, and conventional overcoats do not have sufficient endurance and hardness since they are merely applied to the substrate surfaces. In addition, they hardly possess an oil repelling property. Since the agents are physically adhered to the substrate surfaces, they have endurance and solidity deficiencies.

SUMMARY OF THE INVENTION

An objective of the invention is to provide a finishing agent with superior water repelling and lustering properties and a method of using the same, wherein an overcoat chemically bonded to a substrate surface has sufficient endurance and hardness, and wherein the overcoat with an oil repelling property is formed on the substrate surface, thereby solving the above-noted problems.

In order to accomplish the above objective, one embodiment of the finishing agent of the invention is comprised of a chemically adsorptive compound with at least one chlorosilyl group, and a nonaqueous viscous liquid or solid medium.

In another aspect of the invention, a finishing agent is comprised of a chemically adsorptive compound with at least one chlorosilyl group, a tertiary amine or amide with no active hydrogen, and a nonaqueous viscous liquid or solid medium.

It is preferable in this invention that the content of a tertiary amine or amide with no active hydrogen in the agent is one to three times more concentrated than that of the chemically adsorptive compound in number of moles.

It is preferable in this invention that an abrasive material be added to the finishing agent to efficiently provide luster.

It is preferable in this invention that the viscosity of a viscous liquid or solid medium is 1000 cps or above to prevent it from running down the agent before the reaction of the chemically adsorptive compound is completed.

It is preferable in this invention that, in order to keep the fluidity of the finishing agent and to simplify wiping after the application of the agent, the agent comprises a viscous liquid or solid medium with its boiling point at 100° C. or above, and is mixed with a second nonaqeous viscous liquid or solid medium having a boiling point between room temperature and 100° C.

It is preferable in this invention that the chemically adsorptive compound comprises fluorocarbon groups to provide effective anti-contaminating and water and oil repelling properties more effectively.

It is preferable in this invention that, in order to provide effective anti-contaminating, water and oil repelling and lubricating properties, the chemically adsorptive compound is provided as seen below:

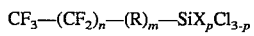

wherein n represents 0 or an integer; R represents an alkyl, vinyl, ethynyl, aryl group or a substituent comprising a silicon or oxygen atom; m represents 0 or 1; and X represents H, an alkyl, alkoxyl or a substituent comprising a fluoroalkyl or fluoroalkoxy group; and p represents 0, 1 or 2.

It is preferable in this invention that, to provide an effective abrasion property, an abrasive material is at least one material, of particles less than 10 μm in diameter, selected from the group consisting of alumina, silicon carbide, boron carbide, chromium oxide, iron oxide, synthetic diamond and fine-grained silica.

It is preferable in this invention that the boiling point of a tertiary amine or amide with no active hydrogen is 200° C. or above.

A method of using a finishing agent of the invention comprises the following procedures:

applying a finishing agent, comprising a chemically adsorptive compound with at least one chlorosilyl group and a nonaqueous viscous liquid or solid medium, to a substrate surface comprising hydrophilic groups;

reacting the chemically adsorptive compound to the substrate surface at room temperature;

removing the finishing agent containing unreacted chemically adsorptive compound.

It is preferable in the above-noted composition that the substrate comprises at least one material chosen from the group consisting of metals, ceramics, glass, plastic, stone, wood, paper, fiber and leather.

It is preferable in the above-noted composition that the substrate surface is made hydrophilic beforehand by treatment in a plasma or corona atmosphere containing oxygen.

In the above-noted composition, the chemically adsorptive compound comprising at least one chlorosilyl group is chemically reacted to the moisture in the air, thereby generating hydrochloric acid gas. The acid gas, however, can be trapped as an ammonium hydrochloride if the content of the tertiary amine or amide in the agent is more than that of the chemically adsorptive compound in moles.

By using a finishing agent of the invention and following the above-noted method, a chemically adsorptive compound would be fixed to a substrate surface via covalent bonding, thereby forming an ultra thin water and oil repelling highly durable overcoat quite easily. The operation of applying the agent is also simple, and does not require large-scale equipment for the overcoating.

Based on a method of using a finishing agent of the invention, the agent, comprising a chemically adsorptive compound with at least one chlorosilyl group and a viscous liquid or solid medium, is applied to a substrate surface comprising hydrophilic groups. Then, the substrate surface is reacted with the compound comprising at least one chlorosilyl group. In the case of active hydrogens being contained in the substrate surface, a dehydrochlorination reaction would be generated between the chlorosilyl groups of the compound and the active hydrogens, thereby fixing the compound to the substrate surface by a covalent bonding via Si atoms. Unreacted finishing agent is then either wiped off or washed away with water. Although the compound is very reactive to moisture in the air, a nonaqueous viscous liquid or solid medium can protect the substrate surface from moisture in the air, thereby helping to promote the dehydrochlorination reaction on the surface. As a result, the compound is fixed to the substrate surface by a covalent bond via Si atoms, thus forming an ultra thin film on the surface. By adding a fluorocarbon group to the compound, moreover, a strong water and oil repelling fluorocarbon film can be conveniently formed on the substrate surface.

It is preferable to apply $CF_3-(CF_2)_n-(R)_m-SiX_pCl_{3-p}$ (wherein n is 0 or an integer; R is an alkyl, vinyl, ethynyl, aryl group or a substituent comprising silicon or oxygen atoms; m is 0 or 1; x is H, an alkyl, alkoxyl group or a substituent comprising a fluoroalkyl or fluoroalkoxy group; and p is 0, 1 or 2) as a compound comprising at least one chlorosilyl group.

Conveniently, a finishing agent is inhibited from running down when it is applied to a substrate surface when the viscosity of a viscous liquid or solid medium is 1000 cps or above. If a viscous liquid or solid medium with its boiling point at 100° C. or above is mixed with one with its boiling point between room temperature and 100° C., the applied film can firm up quickly right after the application of the agent by vaporizing the material with the low boiling point. As a result, the removal of the agent is made simple.

Moreover, if an abrasive material, of particles less than 10 μm in diameter, such as alumina, silicon carbide, boron carbide, chromium oxide, iron oxide, synthetic diamond or fine-grain silica, is added to a finishing agent, a small amount of the substrate surface would be removed without reducing the luster of the surface. As a result, it is easier to promote the reaction between the finishing agent and the substrate surface. If a resin grain such as polytetrafluoro ethylene is added to the agent, the application of the agent is made simple. In addition, the film is strengthened against friction.

A substrate of the present invention which utilizes active hydrogens, may comprise metals, ceramics, glass, plastic, paper, fiber, leather or the like. In case of plastic or fiber with no active hydrogen, the substrate surface can be made hydrophilic by treatment in a plasma or corona atmosphere containing oxygen.

DETAILED DESCRIPTION OF THE INVENTION

Figure 1A:
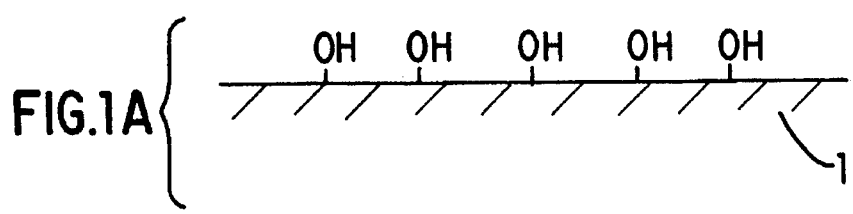
FIG. 1 is a cross-sectional view of a substrate surface, enlarged to a molecular level, explaining the procedures of a surface finishing treatment of the first example according to the invention.

A finishing agent of the invention is mainly comprised of a chemical admolecule (an abbreviation denoting a chemically adsorptive compound) with at least one chlorosilyl group, and a nonaqueous viscous liquid or solid medium for dispersing the admolecule.

Alternatively, the agent is mainly comprised of a chemical admolecule, a tertiary amine or amide with no active hydrogen and a nonaqueous viscous liquid or solid medium.

The agent also can be comprised of a chemical admolecule, a nonaqueous liquid or solid medium, and a dispersed abrasive material.

As a chemical admolecule, containing at least one chlorosilyl group, a hydrocarbon-based molecule as shown below can be used.

The examples of such a molecule include the following:

$CH_3-(CH_2)_rSiX_pCl_{3-p}$;

$CH_3(CH_2)_sO(CH_2)_tSiX_pCl_{3-p}$;

$CH_3(CH_2)_u-Si(CH_3)_2(CH_2)_v-SiX_pCl_{3-p}$;

$CF_3COO(CH_2)_wSiX_pCl_{3-p}$;

$Cl_{3-p}SiX_p-(R)_m-(CF_2)_n-(R)_m-SiX_pCl_{3-p}$;

$CF_3-(CF_2)_n-(R)_m-SiX_pCl_{3-p}$ wherein r represents 1 to 25; s represents 0 to 12; t represents 1 to 20; u represents 0 to 12; v represents 1 to 20; w represents 1 to 25; n represents 0 or an integer; R represents an alkyl, vinyl, ethynyl, aryl group and a substituent comprising silicon or oxygen atoms; m represents 0 or 1; X represents H, an alkyl, alcoxyl group or a substituent comprising fluoroalkyl or fluoroalkoxy groups; and p represents 0, 1 or 2.

In addition, the following includes the specific examples of the reagents;

$CH_3CH_2O(CH_2)_{15}SiCl_3$;

$CH_3(CH_2)_2Si(CH_3)_2(CH_2)_{15}SiCl_3$;

$CH_3(CH_2)_6Si(CH_3)_2(CH_2)_9SiCl_3$;

$CH_3COO(CH_2)_{15}SiCl_3$;

$CF_3(CF_2)_7(CH_2)_2SiCl_3$;

$Cl_3Si(CH_2)_2(CF_2)_6(CH_2)_2SiCl_3$;

$CF_3(CF_2)_5(CH_2)_2SiCl_3$;

$CF_3(CF_2)_7C_6H_6SiCl_3$.

Triethylamine, trimethylamine, pyridine, N-methylpyrrolidinone, N-methylpyrrole, N/N-dimethylaniline, triazine, dimethylbutylamine, dipyridine, indole, N/N-dimethylnaphthylamine or the like are included as a tertiary amine or amide with no active hydrogen. The content of the amine or amide in a finishing agent is more than the amount of hydrochloric acid, made from the chemical admolecule, in moles. More specifically, in case of a chemical admolecule comprising one chlorosilyl group, the content should be the same as that of the admolecule in moles. If the chemical admolecule comprises two chlorosilyl groups, the content of the amine or amide should twice as much as that of the admolecule in moles. The content of the amine or amide in the agent should be also three times more than that of the admolecule comprising three chlorosilyl groups. (However, it is believed that no problems would arise even if the amount of added amine or amide is excessive.) It is preferable that the content of the admolecule in a finishing agent of the invention is 1 to 30% by weight.

Moreover, any nonaqueous solvent having no active hydrogen can be used as a viscous liquid or solid medium. Petroleum-based solvents, silicone, paraffin based wax or the like are especially cheap and useful.

As such solvents, the following examples can be included:

petroleum naphtha; solvent naphtha; petroleum ether; petroleum benzene; isoparaffin; N-paraffin; decalin; industrial gasoline; kerosene; ligroin; dimethylsilicone; phenylsilicone; alkyl modified silicone; polyether silicone; paraffin wax; microcrystal wax; polyethylene wax; ester wax; wax oxide; and petroleum wax.

The above-noted examples, alone or in combination can be applied as the viscous liquid or solid medium in the invention. The preferable content of the liquid or medium in a finishing agent is 50 to 90% by weight.

In case of the viscosity of the liquid or medium being 1000 cps or above, a finishing agent does not run down, and the handling of the agent is easy. However, it is difficult to handle the agent if the liquid or medium is too firm. The removal of unreacted agent is simple if the viscous liquid or the solid medium with its boiling point at 100° C. or above is mixed with one with its boiling point between room temperature and 100° C.

Moreover, if an abrasive material around several microns in diameter, such as alumina, silicon carbide, boron carbide, chromium oxide, iron oxide, synthetic diamond or fine-grain silica, is added to a finishing agent, a small amount of substrate surface would be removed during the application of the agent. As a result, the reaction of the chemical admolecule to the substrate is generated easily. The preferable content of the abrasive material in the agent is 1 to 10% by weight.

A method of using a finishing agent of the invention comprises the following procedures;

washing a substrate surface throughly;

applying a finishing agent, comprising a admolecule with at least one chlorosilyl group, and a nonaqueous viscous liquid or solid medium;

reacting the admolecule to the substrate surface at room temperature, thus causing a dehydrochlorination reaction between the chlorosilyl groups and the active hydrogens contained in the substrate surface;

covalently bonding the admolecule to the substrate surface via Si atoms;

wiping off or washing away the extra agent with water.

(In the last procedure, the admolecule fixed on the substrate surface is likely to react to moisture in the air. A nonaqueous viscous liquid or solid medium, however, would protect the substrate surface from moisture, thereby helping to promote the dehydrochlorination reaction.)

After the above-noted procedures, an admolecule comprising at least one chlorosilyl group is fixed to a substrate surface by a covalent bonding via Si atoms, thereby forming an ultra thin film.

As the examples of a substrate used for the invention, substrates with hydrophilic surfaces—metals such as Al, Cu, stainless steel or the like, glass, ceramics, paper, fiber, leather or other hydrophilic groups—are included. In the case that a material, such as plastic, does not have a hydroxyl group on its surface, the hydroxyl groups can be introduced to the surface by a corona treatment of 100 W for 20 minutes in a plasma atmosphere containing oxygen, thus making the surface hydrophilic. However, in case of polyamide and polyurethane resin having imino groups (>NH) on their surfaces, such treatment is not necessary; a dehydrochlorination reaction is promoted between the hydrogens of the imino groups (>NH) of the substrate and the chlorosilyl groups (—SiCl) of the chemical admolecule, thereby forming siloxane bonds (—SiO—). By fixing an ultra thin fluorocarbon-based polymer to a substrate surface, numerous applications present themselves, including electric goods such as a hot plate, rice steamer or the like, automobiles, industrial equipment, glass, mirrors, lenses for glasses, interior goods, apparel or the like. The quality of the substrate is also improved with regard to anti-heat, weather, and abrasion properties.

This invention can be applicable for various uses and materials as described in the following;

(a) examples of substrates—metal, ceramics, plastic, wood, stone (the invention being applicable even when the substrate surface is coated with paint or the like in advance);

(b) examples of cutlery—kitchen and other knives, scissors, engraver, razor blade, hair clippers, saw, plane, chisel, gimlet, badkin, cutting tools, drill tip, blender blade, juicer blade, flour mill blade, lawn mower blade, punch, straw cutter, stapler, blade for can opener, surgical knife or the like;

(c) examples of needles—acupuncture needle, sewing needle, sewing-machine needle, long thick needle for making tatami, syringe needle, surgical needle, safety pin or the like;

(d) examples of products in the pottery industry—products made of pottery, glass, ceramics or enameled products, including hygienic potteries (such as a chamber pot, wash-bowl, bathtub, etc.), tableware (such as a rice bowl, plate, bowl, teacup, glass, bottle, coffee-pot, pots and pans, earthenware mortar, cup, etc.), flower vases (such as a flower bowl, flowerpot, small flower vase, etc.), chemistry apparatus (such as a beaker, reacter vessel, test tube, flask, culture dish, condenser, stirring rod, stirrer, mortar, vat, syringe), roof tile, tile, enameled tableware, enameled wash bowl, and enameled pots and pans;

(e) examples of mirrors—hand mirror, full-length mirror, bathroom mirror, washroom mirror, mirrors for automobile (back and side mirrors), half mirror, mirror for show window, mirrors for department store or the like;

(f) examples of molding parts—die for press molding, die for cast molding, die for injection molding, die for transfer molding, die for vacuum molding, die for blow forming, die for extrusion molding, die for inflation molding, die for fiber spinning, calender processing roll;

(g) examples of ornaments—watch, jewelry, pearl, sapphire, ruby, emerald, garnet, cat's—eye, diamond, topaz, bloodstone, aquamarine, turquoise, agate, marble, amethyst, cameo, opal, crystal, glass, ring, bracelet, brooch, tiepin, earrings, necklace, glasses frames (of patinum, gold, silver, aluminum, titanium, tin, compound metals of these elements, or stainless steel) or the like;

(h) examples of molds for food—cake mold, cookie mold, bread mold, chocolate mold, jelly mold, ice cream mold, oven plate, ice tray or the like;

(i) examples of cookware—pots and pans, iron pot, kettle, pot, frying pan, hot plate, net for grilling food, tool for draining off oil, plate for making takoyaki or the like;

(j) examples of paper—photogravure paper, water and oil repellent paper, paper for posters, high-quality paper for pamphlets or the like;

(k) examples of resin—polyolefin (such as polypropylene, polyethylene, etc.), polyvinylchloride, polyvinylidenechloride, polyamide, polyimide, polyamideimide, polyester, aromatic polyester, polystyrene, polysulfone, polyethersulfone, polyphenylenesulfide, phenolic resin, furan resin, urea resin, epoxide, polyurethane, silicon resin, ABS resin, methacrylic resin, ethylacrylate resin, ester resin, polyacetal, polyphenyleneoxide or the like;

(l) examples of household electric goods—television, radio, tape recorder, audio goods, CD player, refrigerator, freezer, air conditioner, juicer, blender, blade of an electric fan, lighting equipment, dial plate, hair drier for perm or the like;

(m) examples of sporting goods—skis, fishing rod, pole for pole vault, boat, sailboat, jet skis, surfboard, golf ball, bowling ball, fishing line, fishing net, fishing float or the like;

(n) examples of vehicle parts;
   (1) ABS resin—lamp cover, instrument panel, trimming parts, and protector for a motorcycle,
   (2) cellulose plastic—markings for automobile, and steering wheel,
   (3) FRP (Fiber Reinforced Plastics)—bumper, and engine cover,
   (4) phenolic resin—brake,
   (5) polyacetal—wiper, wiper gear, gas valve, carburetor parts,
   (6) polyamide—radiator fan,
   (7) polyarylate (polycondensation polymerization by bisphenol A and pseudo phthalic acid)—direction indicator lamp (or lens), cowl board lens, relay case,
   (8) polybutylene terephthalate—rear end, front fender,
   (9) poly amino-bismaleimide—engine parts, gear box, wheel, suspension drive system,
   (10) methacrylate resin—lamp cover lens, meter panel and cover, and center mark,
   (11) polypropylene—bumper,
   (12) polyphenylene oxide—radiator grill, wheel cap,
   (13) polyurethane—bumper, fender, instrument panel, and fall,
   (14) unsaturated polyester resin—body, gas tank, heater housing, meter panel, (o) examples of stationary goods—fountain pen, ballpoint pen, mechanical pencil, pencil case, binder, desk, chair, book shelf, rack, telephone base, ruler, draftsman's outfit or the like;

(p) examples of building materials—roof materials (such as ceramic tile, slate, tin such as used in galvanized iron plate, etc.), outer wall materials (such as wood including processed wood, mortar, concrete, ceramic sizing, metallic sizing, brick, building stone, plastic material, metallic material including aluminum, etc.), interior materials (such as wood including processed wood, metallic material including aluminum, plastic material, paper, fiber, etc.) or the like;

(q) examples of stone materials—granite, marble or the like, used for building, building material, works of art, ornament, bath, gravestone, monument, gatepost, stone wall, sidewalk, paving stone, etc.

(r) examples of musical instruments and audio apparatus—percussion instruments, string instruments, keyboard instruments, woodwind instruments, brass instruments or the like, more specifically, drum, cymbals, violin, cello, guitar, koto, piano, flute, clarinet, shakuhachi, horn, etc., and microphone, speaker, earphone or the like.

(s) others—high voltage insulator with good water, oil and contamination repelling properties, including thermos bottles, vacuum apparatus, insulator for transmitting electricity, spark plugs or the like.

The invention will be explained specifically in the following embodiments.

EXAMPLE 1

Soft solid wax was prepared in the following procedures:
mixing an oil-based solvent, a silicone, a paraffin based wax, an admolecule comprising at least one chlorosilyl group and an abrasive material mentioned below in an Erlenmeyer flask;

| | |
|---|---|
| (as an oil-based solvent) isooctane (bp. 113° C.) | 20 g |
| (as a silicone) silicone oil (Shinetsu Kagaku Kogyo KF-96, 1000 cps) | 20 g |
| (as a paraffin based wax) paraffine (Kanto Kagaku, mp 54–56° C.) | 20 g |
| (as an admolecule comprising at least one chlorosilyl group) heptadecafluorodecyl trichlorosilane | 8 g |
| (as an abrasive material) alpha-alumina (1 micron) | 5 g | stirring the mixed material at 90° C., thus providing a suspension;

cooling the suspension down to the room temperature.

The wax obtained from the above-noted procedures is used as a finishing agent for the following treatments in order to evaluate the water and oil repelling property and also endurance.

Figure 1B:
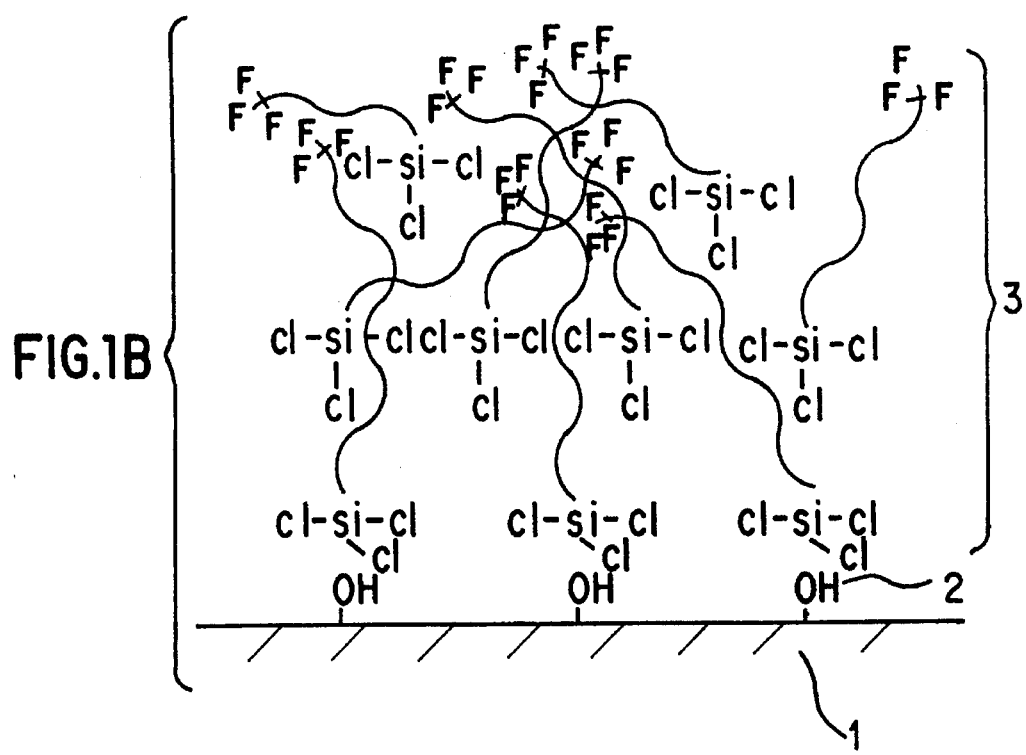
Figure 1C:
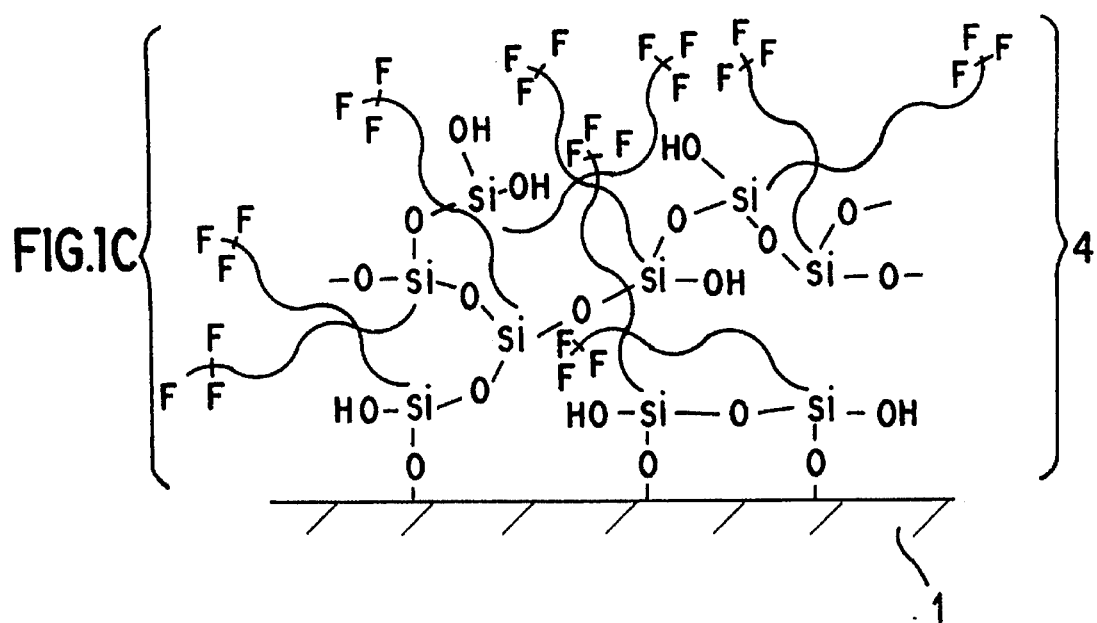

An ultra thin film was formed in the following procedures:

preparing a window glass 1 (see FIG. 1 (a)) of an automobile with its surface comprising numerous OH groups 2 as a substrate;

applying the prepared finishing agent to the substrate surface with a sponge;

letting the substrate sit for 20 to 30 minutes, thus vaporizing isooctane and forming a white coating film;

contacting heptadecafluorodecyl trichlorosilane with OH groups on the substrate surface at a certain probability as shown in FIG. 1 (b), thereby reacting and fixing heptadecafluorodecyl trichlorosilane molecules to the substrate surface by a dehydrochlorination reaction between the chlorosilyl groups of the molecules and the active hydrogens of OH groups via a SiO bonding;

wiping off the extra agent with a dustcloth, thereby forming an ultra thin fluorocarbon film 4 with a thickness at a nanometer level on the substrate surface by covalently bonding numerous heptadecafluorodecyl trichlorosilane molecules shown in FIG. 1 (c) to the surface via a network bonding of SiO.

After the above-noted procedures, furthermore, the heptadecafluorodecyl trichlorosilane molecule can react to moisture in the air; however, a nonaqueous viscous liquid or solid medium, such as silicon oil and paraffin, can prevent the moisture from disturbing the hydrochlorination reaction on the substrate surface.

The film, in addition, was not peeled off by a cross-cut adhesion test. The contact angle of water was 118°. Oil applied on the substrate surface was easily wiped off with tissue paper.

EXAMPLE 2

A finishing agent, a mixture of the materials shown below, was prepared, and the same evaluation as in Example 1 was directed.

| | |
|---|---|
| cyclohexane (bp. 80° C.) | 20 g |
| silicone oil (Shinetsu Kagaku Kogyo, KF-96, 1000 cps) | 20 g |
| paraffin (Kanto Kagaku, mp. 54–56° C.) | 20 g |
| heptadecafluorodecyl trichlorosilane | 8 g |
| alpha-alumina (1 micron) | 5 g |

The same results as in Example 1 were obtained in this example except that a white coating film was formed after applying the agent to the substrate surface and letting the substrate sit for 10 to 15 minutes. The results are shown in Table 1.

EXAMPLE 3

The same experiment as in Example 2 was directed in this example except that heptadecafluorodecyl trichlorosilane $(CF_3(CF_2)_7—(CH_2)_2—SiCl_3)$ used in Example 2 was replaced with tridecafluorooctyl trichlorosilyl $(CF_3(CF_2)_5(CH_2)_2—SiCl_3)$. The results are shown in Table 1.

EXAMPLE 4

The same experiment as in Example 2 was directed except that the glass used in Example 2 was replaced with a back mirror. The results are shown in Table 1.

EXAMPLE 5

The same experiment as in Example 2 was directed except that the glass used in Example 2 was replaced with a bonnet of an automobile. The results are shown in Table 1.

EXAMPLE 6

The same experiment as in Example 2 was directed except that the glass used in Example 2 was replaced with an urethane bumper. The results are shown in Table 1.

EXAMPLE 7

The same experiment as in Example 2 was directed except that the alpha-alumina used in Example 2 was replaced with silica (8 microns). The results are shown in Table 1.

EXAMPLE 8

The same experiment as in Example 1 was directed except that the amount of isooctane was changed to 40 g. The viscosity of the prepared viscous liquid wax was about 3000 to 4000 cps. The results are shown in Table 1.

Reference 1

The same experiment as in Example 1 was directed except that heptadecafluorodecyl trichlorosilane was replaced with heptadecafluorodecyl trimetoxysilane. The results are shown in Table 1.

Reference 2

The same experiment as in Example 1 was directed except that isooctane was replaced with ethanol. The results are shown in Table 1.

TABLE 1

|  | Contact Angle of Water (°) | | Contact Angle of Oil (°) | |
|---|---|---|---|---|
|  | Initial Number | After Rubbing Test | Initial Number | After Rubbing Test |
| Example 1 | 120 | 118 | 97 | 94 |
| Example 2 | 118 | 116 | 95 | 91 |
| Example 3 | 113 | 111 | 93 | 92 |
| Example 4 | 113 | 112 | 94 | 91 |
| Example 5 | 110 | 110 | 94 | 93 |
| Example 6 | 111 | 113 | 94 | 92 |
| Example 7 | 117 | 108 | 93 | 89 |
| Example 8 | 115 | 111 | 93 | 91 |
| Reference 1 | 96 | 45 | 65 | 21 |
| Reference 2 | 89 | 48 | 42 | 12 |

As clearly seen from Table 1, the substrate treated with a finishing agent of the invention maintained its water and oil repelling or hydrophilic property even after the surface was rubbed repeatedly with a wet cloth. In Reference 1, water and oil repelling properties were low even before the rubbing test, and the properties were almost completely absent after the test.

The substrate surface formed with a polymer film comprising fluoroalkyl groups has an excellent anticontamination property. The substrate in Example 1 was dipped and held in a salad oil after a rubbing test, and the oil on the substrate surface was easily wiped off with tissue paper. In case of the substrate in Reference 1, however, oil remained on the substrate surface.

EXAMPLE 9

Soft solid wax was prepared in the following procedures:

mixing an oil-based solvent, a silicone, a paraffin-based wax, an amide without an active hydrogen, an admolecule comprising at least one chlorosilyl group, and an abrasive material mentioned below in an Erlenmeyer flask;

| | |
|---|---|
| (as an oil-based solvent) isooctane (bp. 113° C.) | 20 g |
| (as a silicone) silicone oil (Shinetsu Kagaku Kogyo, KF-96, 1000 cps) | 20 g |
| (as a paraffin based wax) paraffin (Kanto Kagaku, mp 54–56° C.) | 20 g |
| (as an amide without an active hydrogen) N-methylpyrrolidinone (bp. 202° C.) | 15 g |
| (as an admolecule comprising at least one chlorosilyl group) heptadecafluorodecyl trichlorosilane | 8 g |
| (as an abrasive material) alpha-alumina (1 micron) | 5 g | stirring the mixed material at 90° C., thus providing a suspension;

cooling the suspension down to room temperature.

By using the wax prepared in the above-noted procedures as a finishing agent, the same experiment as in Example 1 was conducted.

In Example 1, hydrochloric acid gas with an irritating odor was generated by the reaction between heptadecafluorodecyl trichlorosilane molecules and moisture in the air; however, in this example, such an odor was hardly generated because of the effect of added N-methylpyrrolidinone. N-methylpyrrolidinone can trap hydrochloric acid, thereby preventing the generation of the odor. Normally tertiary amine provides an irritating odor, but N-methylpyrrolidinone with a high boiling point does not provide such an odor since it is not easily vaporized.

The film was not peeled off after a cross-cut adhesion test. The contact angle of water was 112°. Oil applied on the substrate surface was easily wiped off with tissue paper.

EXAMPLE 10

A finishing agent, a mixture of the materials shown below, was prepared, and the same evaluation as in Example 9 was directed.

| | |
|---|---|
| cyclohexane (bp. 80° C.) | 20 g |
| silicone oil (Shinetsu Kagaku Kogyo, KF-96, 1000 cps) | 20 g |
| paraffin (Kanto Kagaku, mp. 54–56° C.) | 20 g |
| triethylamine (bp. 90° C.) | 8 g |
| heptadecafluorodecyl trichlorosilane | 8 g |
| alpha-alumina (1 micron) | 5 g |

The same results as in Example 9 were obtained in this example except that a white coating film was formed after applying the agent to the substrate surface and letting the substrate sit for 10 to 15 minutes. Similar to the case in Example 9, an irritating odor of hydrochloric acid was hardly generated in this example. However, unlike Example 9, strong odor of triethylamine was generated in this example. This is because triethylamine has a low boiling point of 90° C., and is thus likely to vaporize and generate the odor.

The film was not peeled off by a cross-cut adhesion test. The contact angle of water was 113°. Oil applied on the substrate surface was easily wiped off with tissue paper.

Based on the results obtained in Examples 9 and 10, it is preferable that the boiling point of the tertiary amine, added in a finishing agent, should be around 200° C. or above.

As explained above, by the method of using a finishing agent of the invention, a polymer film can be formed on the substrate, thus efficiently forming an overcoat on a material such as plastic, ceramics, glass or the like.

If an admolecule comprising fluorocarbon and chlorosilyl groups is used as a material for forming a film, a highly dense, ultra thin, water and oil repelling, anti-contaminating and durable film with a uniform thickness can be formed on a substrate including a metal, such as Al, Cu, stainless steel or the like by chemical adsorption reaction.

The method of forming a chemically adsorbed film of the invention is effective in that an anti-heat, weather, abrasion ultra thin film can be applied for coating electric goods such as a hot plate, rice steamer, automobiles, industrial equipment, glass, mirrors, lenses for glasses or the like.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

I claim:

1. A finishing agent comprising a chemically adsorptive compound with a chlorosilyl group, and a nonaqueous liquid or solid medium having a boiling point of 100° C. or above.

2. A finishing agent comprising a chemically adsorptive compound with a chlorosilyl group, a tertiary amine or amide with no active hydrogen, and a nonaqueous liquid or solid medium having a boiling point of 100° C. or above.

3. The finishing agent according to claim 2, wherein the amount of said tertiary amine or amide in said finishing agent is one to three times more than that of said chemically adsorptive compound in moles.

4. The finishing agent according to claim 1, 2 or 3, wherein said agent further comprises an abrasive material.

5. The finishing agent according to claim 1 or 2, wherein said nonaqueous liquid or solid medium has a viscosity of 1000 cps or above.

6. The finishing agent according to claim 1 or 2, wherein the agent is mixed with a second nonaqueous liquid or solid medium having a boiling point between room temperature and 100° C.

7. The finishing agent according to claim 1 or 2, wherein said chemically adsorptive compound with a chlorosilyl group comprises fluorocarbon groups.

8. The finishing agent according to claim 1 or 2, wherein said chemically adsorptive compound with a chlorosilyl group is provided as seen below:

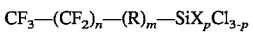

$$CF_3-(CF_2)_n-(R)_m-SiX_pCl_{3-p}$$

wherein n represents 0 or an integer; R represents an alkyl, vinyl, ethynyl, aryl group or a substituent comprising a silicon or oxygen atom; m represents 0 or 1; X represents H, an alkyl, alkoxyl group or a substituent comprising fluoroalkyl or fluoroalkoxyl groups; and p represents 0, 1 or 2.

9. The finishing agent according to claim 4, wherein said abrasive material comprises at least one component, of particles smaller than 10 μm in diameter, and is chosen from the group consisting of: alumina, silicon carbide, boron carbide, chromium oxide, iron oxide, synthetic diamond and fine-grain silica.

10. The finishing agent according to claim 2, wherein the boiling point of said tertiary amine or amide with no active hydrogen is about 200° C. or above.

11. The finishing agent according to claim 1, wherein the non-aqueous liquid or solid medium is present in an amount of from 50 to 90% by weight of the finishing agent.

12. The finishing agent according to claim 2, wherein the non-aqueous liquid or solid medium is present in an amount of from 50 to 90% by weight of the finishing agent.

13. The finishing agent according to claim 1, wherein the non-aqueous liquid or solid medium has a viscosity of 1000 CPS or more.

14. The finishing agent according to claim 2, wherein the non-aqueous liquid or solid medium has a viscosity of 1000 CPS or more.

* * * * *

UNITED STATES PATENT AND TRADEMARK OFFICE
CERTIFICATE OF CORRECTION

PATENT NO.  : 5,545,255

DATED       : August 13, 1996

INVENTOR(S) : Kazufumi Ogawa

It is certified that error appears in the above-identified patent and that said Letters Patent is hereby corrected as shown below:

Column 5, line 43, change "A1" to --Al--.

Column 11, line 22, change "A1" to --Al--.

Signed and Sealed this

Twenty-fourth Day of December, 1996

Attest:

BRUCE LEHMAN

Attesting Officer

Commissioner of Patents and Trademarks